United States Patent [19]

Hwang

[11] Patent Number: 5,319,772
[45] Date of Patent: Jun. 7, 1994

[54] METHOD AND APPARATUS FOR CHANGING THE OPERATING CLOCK SPEED OF A COMPUTER SYSTEM

[75] Inventor: Ching-Tung Hwang, Taoyuan, Taiwan

[73] Assignee: Acer Incorporated, Taipei, Taiwan

[21] Appl. No.: 34,594

[22] Filed: Mar. 22, 1993

Related U.S. Application Data

[63] Continuation of Ser. No. 792,166, Nov. 14, 1991.

[51] Int. Cl.$^5$ .............................................. G06F 1/04
[52] U.S. Cl. .................................. 395/550; 395/375; 364/DIG. 1; 364/273.1; 364/247
[58] Field of Search ................ 395/550, 375; 364/200, 364/273.1, 247

[56] References Cited

U.S. PATENT DOCUMENTS

| | | | |
|---|---|---|---|
| 4,819,164 | 4/1989 | Branson | 364/200 |
| 5,025,387 | 6/1991 | Frane | 364/200 |
| 5,041,964 | 8/1991 | Cole et al. | 364/200 |
| 5,047,924 | 9/1991 | Fujioka et al. | 364/200 |
| 5,086,387 | 2/1992 | Arroyo et al. | 364/200 |

Primary Examiner—Dale M. Shaw
Assistant Examiner—D. Smith
Attorney, Agent, or Firm—Townsend and Townsend Khourie and Crew

[57] ABSTRACT

An apparatus for altering the operating clock frequency of a computer system comprises an input port, a plurality of output ports, and instructing means coupled together by a bus. Latching means and gating means are coupled to CPU and the output ports to control the clock signal received. The input port receives a change frequency signal. In response, the CPU executes the instructions from the instructing means to store the contents of the CPU's internal registers into memory. The CPU then generates a frequency select signal and a reset signal that resets itself. The latch means stores and outputs the frequency select signal to the gating means. The gating means uses the frequency select signal to output one of a plurality of different frequency clock signals received at its select input as the operating clock input of the CPU. The CPU thereafter operates under the newly gated clock signal. After the CPU reset is complete, the CPU reloads its internal registers with the information stored within the memory.

7 Claims, 2 Drawing Sheets

METHOD AND APPARATUS FOR CHANGING THE OPERATING CLOCK SPEED OF A COMPUTER SYSTEM

RELATED APPLICATIONS

This is a continuation of co-pending application Ser. No. 07,792,166 filed on Nov. 14, 1991.

BACKGROUND OF THE INVENTION

1. Field of the Invention

The present invention relates to computer systems and more particularly to a method and apparatus for changing the operating clock speed of the system during doze modes to minimize power consumption.

2. Description of the Related Art

In recent years, the popularity of portable and laptop computers has steadily grown. As a result, computer manufacturers have worked diligently to improve the design and the performance of these computers. Portable and laptop technology has now advanced to a stage where the performance of the portable computers is approximately equal to that of the larger desk top computers. Some portables are capable of operating at a clock speed of 25 MHz or even higher.

Although they perform like desk top computers, portable computers suffer from one inherent disadvantage. Because they are portable, they must be operated under battery power, which means that power conservation is a major concern. One method for saving power is to simply reduce the operating clock speed of the system, but most users demand full performance from their systems so reducing the operating clock speed does not seem to be a desirable method for saving power.

It is not necessary for a computer to always operate at its highest clock speed, however. There are periods, called "doze modes," during which the central processing unit is not executing any instructions. During these periods, the clock speed of the processor may be altered without adversely affecting the operation of the computer. Prior attempts have been made to alter the operating clock speed of a processor but these methods involved changing the clock speed dynamically, that is, on-the-fly without interrupting the processor. However, the prior art methods cannot be implemented in applications where timing paths are critical, such as computer systems using INTEL 80486 series CPUs. Therefore, there exists a need for a method and apparatus for changing the operating clock speed of a computer system which is more generally applicable.

SUMMARY OF THE INVENTION

The present invention provides an improved method and apparatus for changing the operating clock speed of a central processing unit. In a preferred embodiment, the apparatus of the present invention comprises an input port, a plurality of output ports, an instructing means, a latching means having a data input, a clock input, and a data output, and a gating means having a select input, a plurality of data inputs connected to a plurality of clock sources, and an output. The input port receives a change frequency signal and relays this signal to the CPU. In response, the CPU, under the direction of the instructing means, stores the contents of its registers into the memory. The CPU also generates a frequency select signal and a reset signal which resets the CPU. These signals are sent to the output ports and then relayed to the latching means. The latching means receives the reset signal at its clock input and the frequency select signal at its data input. At each occurrence of the reset signal, the latching means outputs the frequency select signal to the select input of the gating means. This causes the gating means to gate one of the clock sources at its data inputs to the CPU. With the CPU reset and the new clock frequency gated to the CPU, the instructing means directs the CPU to reload into its registers the information stored in the memory.

DETAILED DESCRIPTION OF THE INVENTION

Figure 1:
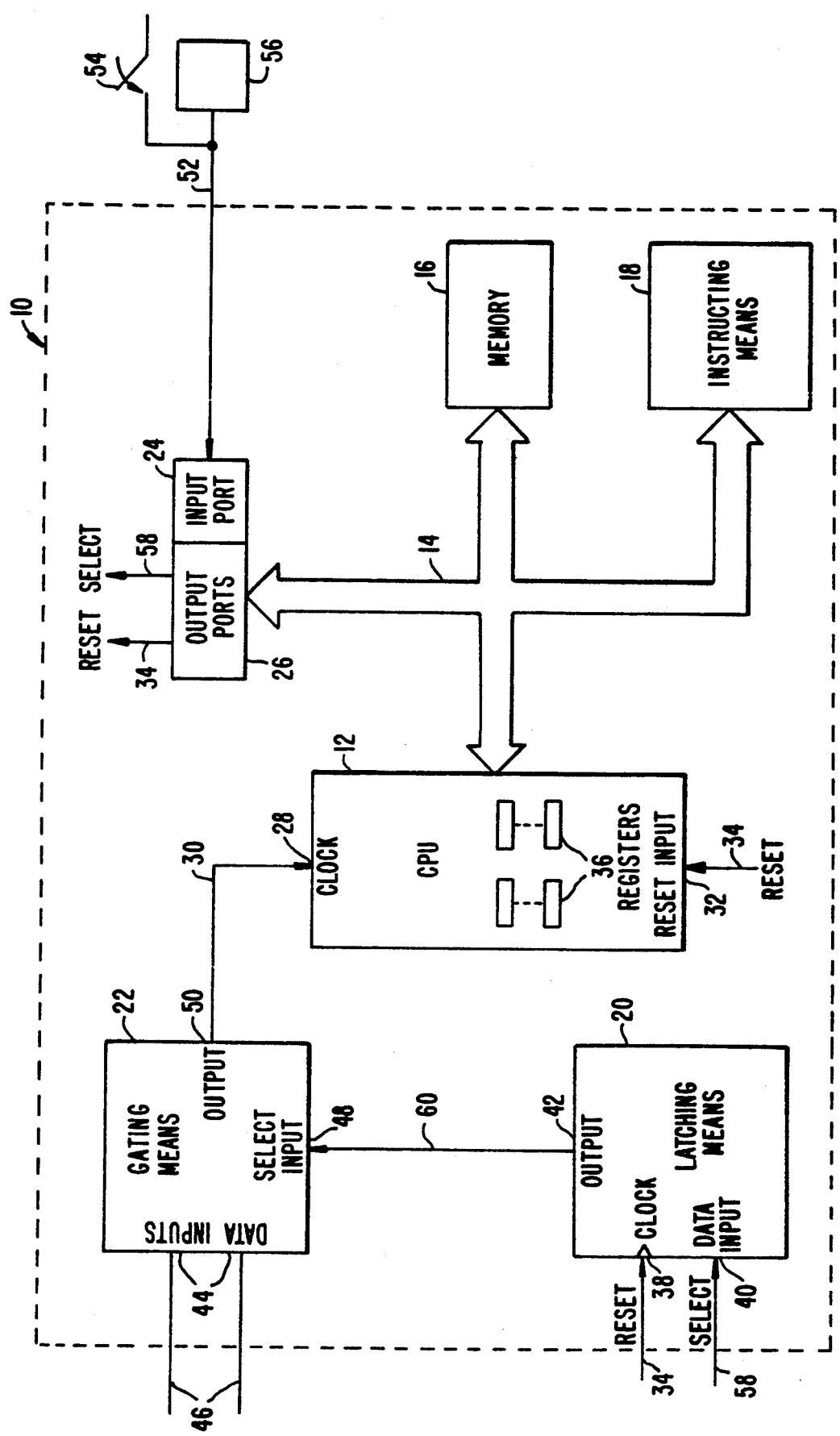
FIG. 1 is a functional block diagram of a computer system including the apparatus of the present invention.

FIG. 1 shows a functional block diagram of a computer system 10 comprising a central processing unit (CPU) 12, a signal bus 14, memory 16, and the apparatus of the present invention. The CPU 12 has a clock input 28 for receiving an operating clock signal 30, a reset input 32 for receiving a reset signal 34, and a plurality of internal registers 36 for storing data and information while the CPU 12 is executing instructions. The CPU 12 is coupled to bus 14, and serves as the central processing unit for an entire computer system 10 which includes the apparatus of the present invention. The apparatus of the present invention further comprises instructing means 18, latching means 20, gating means 22, input port 24, and output ports 26. The input 24 and output ports 26, the memory 16, and the instructing means 18 are also coupled to the bus 14.

The latching means 20 has a clock input 38 for receiving an activating clock signal and a data input 40 for receiving a data signal 58. With each active clock signal it receives, the latching means 20 latches the data signal 58 received at the data input 40 and outputs this signal 58 through the data output 42.

The gating means 22 of the invention receives at its data inputs 44 a plurality of clock signals 46 with each clock signal having a different frequency. The clock signals 46 are generated by a means (not shown) for generating a plurality of clock signals of different frequency such as a plurality of crystal oscillators. Depending upon the status of a signal 60 received at a select input 48, the gating means 22 gates to output 50 one of the clock signals 46. Output 50 is coupled to the clock input 28 of the CPU 12.

During normal operation, the CPU 12 operates at its highest clock frequency to execute the instructions of a computer program and the present invention is inactive. However, during periods where the CPU 12 is not executing any instructions, (i.e., during "doze modes") a change frequency interrupt signal appears on interrupt line 52 to signal to the present invention that a clock frequency change is desired. The interrupt signal 52 may originate from a number of sources including manual switch 54 and power management unit 56. The input port 24 of the present invention receives the interrupt signal 52 and sends the signal via bus 14 to the CPU 12. The CPU 12 responds to the interrupt signal 52 by executing instructions from the instructing means 18.

A set of instructions is sent by instructing means 18 on bus 14 to the CPU 12 to cause the CPU 12 to perform several operations. First, the instructing means 18 causes the CPU 12 to store the contents of the internal registers 36 into the memory 16. The information stored in memory 16 preferably includes data, status and any other information necessary to completely define the state of the CPU 12. Thereafter, instructing means 18 causes the CPU 12 to generate control signals which are sent to output ports 26 via bus 14. These signals are transmitted as a reset 34 and a frequency select 58 signal to other components of computer system 10 by the output ports 26. In the preferred operation, the reset signal 34 is output just after the frequency select signal 58 exits from the output ports 26. The frequency select signal 58 is sent to the latching means 20 just before the reset signal 34 so that the frequency select signal 58 will be on the data input 40 when the latch means 20 is clocked by the reset signal 34. The reset signal 34 is also sent to the reset input 32 of the CPU 12 to reset the CPU 12. Thus, while the CPU 12 is being reset, the active reset signal 34 at clock input 38 causes the latching means 20 to latch onto the frequency select signal 58 at its data input 40. An output signal 60 having the same logic level as the frequency select signal 58 is then output by the latching means 20 through output 42.

The output signal 60 from the latching means 20 is received by the gating means 50 at its select input 48. Depending upon the logic level of the output signal 60, the gating means 22 gates one of the clock signals 46 through output 50 to the clock input 28 of the CPU 12. The CPU 12 thereafter operates in response to a new clock signal. Next, the instructing means 18 causes the CPU 12 to reload into its internal registers 36 the information that was earlier stored into the memory 16. With its vital information restored, the CPU 12 will function as if no interruption took place except that it now operates at a lower clock frequency. At this point, the changing of the operating clock frequency is complete.

Figure 2:
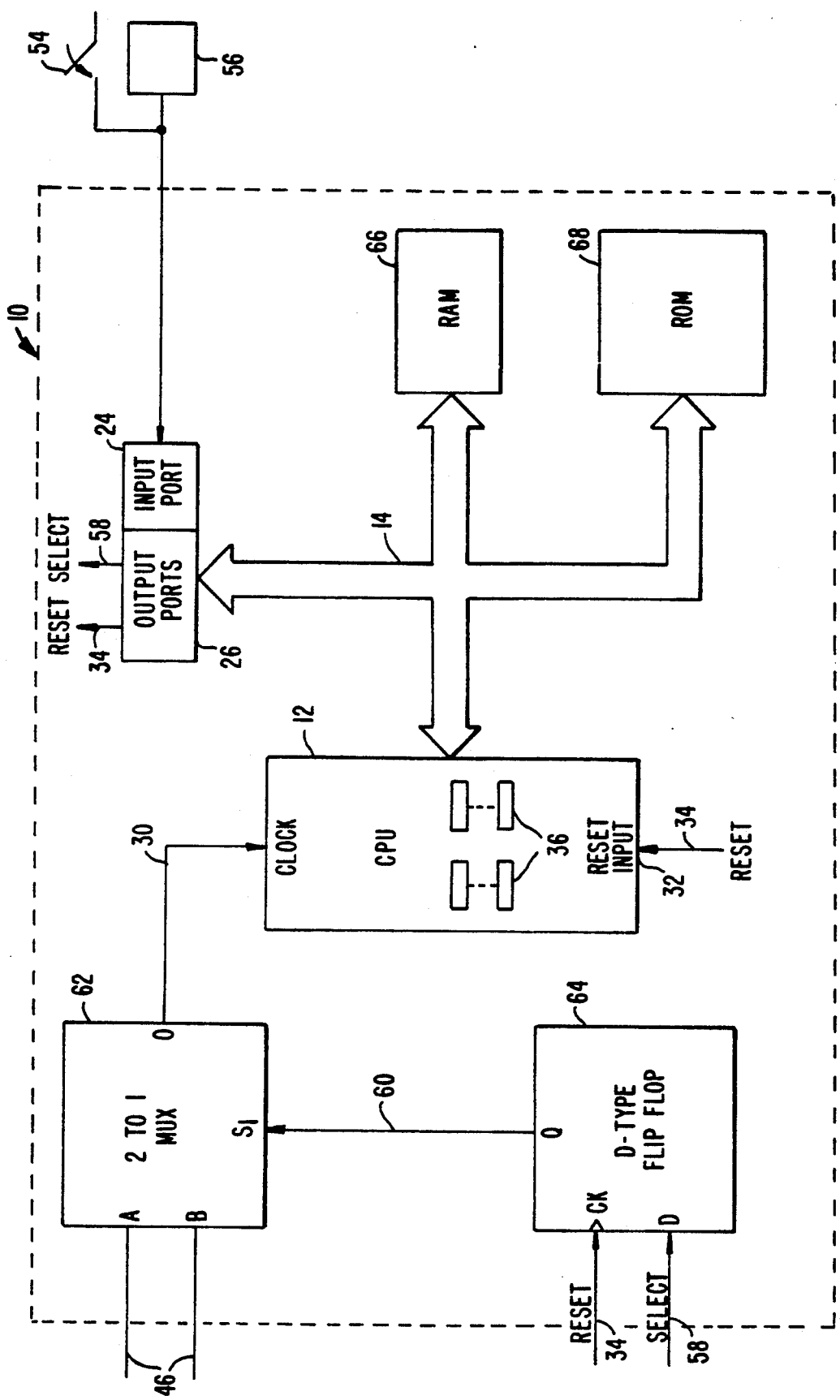
FIG. 2 is a circuit diagram of a computer system including the preferred embodiment of the invention.

A preferred embodiment of the apparatus of the present invention is shown in FIG. 2, wherein the gating means 22 is a 2 to 1 multiplexer 62 having select input $S_1$, data inputs A, B, and output 0. Latching means 20 takes the form of a D-type flip flop 64 with a clock input CK, a data input D, and output Q. In the preferred embodiment, memory 16 is a random access memory (RAM) 66 and instructing means 18 is a Read Only Memory (ROM) 68 containing binary instructions to be executed by the CPU 12. Binary instructions for causing the CPU 12 to perform the functions described above vary from CPU to CPU. The instructions may also be derived by those of ordinary skill in the art without undue experimentation. Thus, the specific instructions need not be described in detail herein. The multiplexer 62, the flip flop 64, and the RAM 66 shown in FIG. 2 are also known in the art so their construction need not be described.

The present invention provides a superior method and apparatus for changing the operating clock speed of a computer system. Because the CPU 12 is actually reset, no timing path problems are encountered. Also, because the CPU's register information is stored before reset and then restored after reset, the CPU 12 operates after reset as if no reset ever occurred. Thus, no information or continuity is lost. Consequently, unlike the prior art, the present invention may be implemented in substantially all systems and applications.

It should be noted that although the invention has been described with reference to certain preferred embodiments, it should not be construed to be so limited. Many modifications can be made by those of ordinary skill in the art with the benefit of this disclosure without departing from the spirit of the invention. For example, the invention has been described with only one latching means 20 and only two clock signals 46, but it is possible to have many more. For instance, the present invention can accommodate four different clock signals 46 by simply having the CPU 12 generate two frequency select signals 58 instead of one. Two flip-flops 64 would be necessary, one for latching each of the frequency select signals 58. The gating means 22 would also need to have four data inputs instead of two and two select inputs instead of one. These and other changes may be made without departing from the spirit and the scope of the invention. Therefore, the invention should not be limited by the specific examples used to illustrate it but only by the scope of the appended claims.

What is claimed is:

1. In a computer system having a signal bus, a memory, a central processing unit (CPU) and means for generating a plurality of clock signals of different frequencies, the CPU having an operating clock input and a plurality of internal registers, the CPU and memory being coupled to the bus, an apparatus for changing the operating clock of the computer system to activate and deactivate a doze mode of the system, said apparatus comprising;
   an input port for receiving a change frequency interrupt signal and for communicating the change frequency interrupt signal to the CPU via the bus;
   a plurality of output ports coupled to the bus, for outputting signals from the CPU via the bus;
   instructing means coupled to the bus for causing the CPU to: (i) store contents of the internal registers into the memory; (ii) generate and send to the output ports a frequency select signal; (iii) generate and send to the output ports a reset signal that resets the CPU; and (iv) reload the contents stored in the memory into the registers of the CPU after the CPU has been reset;
   latching means having a clock input, a data input, and a data output, said latching means for receiving from the output ports the reset signal at the clock input and the frequency select signal at the data input, and outputting the frequency select signal at the data output upon each occurrence of the reset signal; and
   gating means having a select input, a gate output, and a plurality of gate inputs coupled for receiving the clock signals, said gating means receiving at the select input the frequency select signal from the output of the latching means and gating one of the clock signals to the gate output that is coupled to the operating clock input of the CPU.

2. The apparatus of claim 1, wherein the gating means is a multiplexer.

3. The apparatus of claim 1, wherein the instructing means is a memory containing binary instructions to be executed by the CPU.

4. The apparatus of claim 3, wherein the instructing means is a Read Only Memory (ROM).

5. The apparatus of claim 1, wherein the latching means is a D-type flip flop.

6. In a computer system having an input port coupled to a bus, output ports, a central processing unit (CPU)

with a plurality of internal registers, a memory and a plurality of clock signals with each clock signal having a different frequency, a method for switching between operating clock signals to activate and deactivate a doze mode of the computer system, said method comprising the steps of:

(a) receiving a change frequency interrupt signal at the input port and sending the interrupt signal to the CPU via the bus;

(b) storing contents of the internal registers of the CPU into the memory;

(c) coupling clock speed select and reset signals generated by the CPU to a latching means for selecting a clock signal to be gated, and coupling the reset signal back to the CPU for resetting the CPU;

(d) gating the selected clock signal to the CPU; and (e) reloading the contents stored in the memory into the internal registers of the CPU.

7. The apparatus of claim 1 wherein the instruction means includes means for causing the CPU to store only contents of the internal registers into the memory.

* * * * *